(12) United States Patent
Duncan et al.

(10) Patent No.: US 7,082,656 B1
(45) Date of Patent: Aug. 1, 2006

(54) PIPE BEVELING SYSTEM

(76) Inventors: C. Warren Duncan, 422 Alsio Ave., Newport Beach, CA (US) 92663; Bill Glynn, 2585 Twenty-seventh Ave. Nth, St. Petersburg, FL (US) 33713; Bruce Root, 11 High St., Suffield, CT (US) 06078

( * ) Notice: Subject to any disclaimer, the term of this patent is extended or adjusted under 35 U.S.C. 154(b) by 272 days.

(21) Appl. No.: 10/825,925

(22) Filed: Apr. 19, 2004

(51) Int. Cl.
  *B23P 23/00* (2006.01)
  *B23C 3/12* (2006.01)
  *B23B 5/16* (2006.01)

(52) U.S. Cl. ............... 29/33 T; 409/138; 409/218; 279/83; 279/156; 82/113; 83/54; 30/94; 30/102; 451/69; 29/566.1

(58) Field of Classification Search ........... 409/232, 409/234, 210, 214, 218, 138, 180; 279/83, 279/156; 29/33 T, 33, 564, 56.5, 566, 566.1; 82/113, 101, 128; 30/93–94, 102; 83/54; 451/69

See application file for complete search history.

(56) References Cited

U.S. PATENT DOCUMENTS

| 909,908 | A | * | 1/1909 | Juenge | 279/83 |
|---|---|---|---|---|---|
| 1,699,837 | A | * | 1/1929 | Everett | 279/83 |
| 3,431,646 | A | * | 3/1969 | Young | 30/97 |
| 4,180,358 | A | * | 12/1979 | Uribe | 409/179 |
| 4,257,289 | A | * | 3/1981 | Groothius | 82/113 |
| 4,490,909 | A | * | 1/1985 | Wachs et al. | 30/97 |
| 4,566,511 | A | * | 1/1986 | Robinson | 144/48.6 |
| 4,633,621 | A | * | 1/1987 | Weber | 451/461 |
| 4,682,919 | A | * | 7/1987 | Mitchell | 409/179 |
| 5,080,536 | A | * | 1/1992 | Andrews | 408/239 A |
| 6,079,302 | A | * | 6/2000 | Gudleske | 82/47 |
| 6,146,067 | A | * | 11/2000 | Owens | 82/113 |
| 6,938,313 | B1 | * | 9/2005 | Viola et al. | 29/33 T |

FOREIGN PATENT DOCUMENTS

JP  52-071789 A  *  6/1977

OTHER PUBLICATIONS

Diamond Service "Toros" Grinding Wheel, Diamond Service Web Page, 2 pages, Apr. 16, 2004.
PB Tool, Photos 1, 2, and Diagram.

* cited by examiner

*Primary Examiner*—Erica Cadugan
(74) *Attorney, Agent, or Firm*—Charles H. Thomas

(57) ABSTRACT

A tool for beveling the end of a pipe is comprised of a hollow, tubular body having a central, longitudinal axis of rotation, an inboard coupling end, and an opposite outboard working end. A plurality of longitudinally spaced, transversely directed latching pin bores of equal size are defined through the wall of the tubular body. A core member is disposed coaxially within the tubular body. The core member includes a beveling cutter head and a longitudinal stem having a radially inwardly directed, circumferential latch position groove. A transversely oriented latching pin is engaged in a selected one of the latching pin bores in the body and with the latch position groove of the core stem. This allows alternative selection of each of the latch position bores for insertion of the latching pin. The particular bore selected determines the longitudinal position of the core stem latch position groove within the body that will be aligned with the latching pin. This, in turn, determines the extent of protrusion of the core member cutter head from the outboard end of the tubular body, and thus the depth of the beveling cut in the pipe.

19 Claims, 9 Drawing Sheets

PIPE BEVELING SYSTEM

BACKGROUND OF THE INVENTION

1. Field of the Invention

The present invention relates to a tool for beveling an end of a pipe cut on site during a pipe laying installation.

2. Description of the Prior Art

Sections of pipe that are to be utilized in subsurface applications such as drainpipes, cable pipes, gas line pipes, and oil pipelines are cut to specific lengths when they are manufactured. During the pipe section fabrication process, particularly with large diameter pipes, the sections of pipe are often created with an enlarged bell or socket connection at one end, and are beveled or chamfered at the other end. Sections of pipe must be beveled so as to accommodate an O-ring gasket to ensure a fluid-tight connection between the adjacent pipe sections. An enlarged socket or bell coupling is required to prevent the O-ring from being damaged during the laying of the pipe. When a pipe line is laid the beveled end of each section of pipe is inserted into the larger socket or bell connection end of an adjacent pipe section. Each new section of pipe is then forced longitudinally toward the prior sections that have already been laid in position.

It is particularly important for the bevel to be properly formed for large diameter pipes, since the force required to push each pipe section into sealing engagement with the prior sections is too great to be applied manually. The pipe sections are typically pushed into position using levers or a machine bucket. As a consequence, any excess resistance that might be present as a result of an O-ring being damaged cannot be felt when large pipe sections are forced together. Installers can therefore only hope that a leakproof installation has been achieved during assembly of the pipe sections together.

While the machinery available to form bevels or chamfers during the manufacture of the pipe sections reliably produces bevels at the proper angle and depth, there are circumstances in which bevels need to be performed on pipe sections in the field at the job site. Specifically, it is necessary to cut pipes on site whenever plans call for a "T", a "Y", or at the end of a run at a manhole or other junction which requires cutting the pre-cut and pre-beveled pipe sections at the pipeline installation site.

Currently, pipe is typically cut with a power saw having a rotary blade at a job site. This leaves a rough cut pipe end that is roughly perpendicular to the axis of the pipe. The operator then utilizes a hand device, such as a file or grinder attached to the side of the saw blade in order to produce a bevel on the cut end of the pipe. This can be dangerous if the blade is not designed to be used as a grinder. There have been instances of composite, cut off wheels exploding due to the erosion of the reinforcement and abrasive on the sides of the blades. Furthermore, it is very difficult to manually hold the saw so as to produce a uniform bevel of a specific chamfer angle throughout the entire perimeter of the cut end of the pipe. As a consequence, the bevel can be too shallow or two deep.

If a bevel is cut too shallow, the gap for the O-ring is too small and the O-ring cannot fit into it to create a seat during the coupling of two pipe sections. On the other hand, if the bevel is so deep that a sharp edge is produced on the pipe end, the O-ring can be cut when the beveled end of the pipe is forced into the bell or socket connection of an adjacent pipe. In either case, the O-ring is improperly seated and leaking can occur at the pipe coupling.

Furthermore, pipes are supplied with varying wall thicknesses. As a consequence, the amount of a bevel must be changed. If too much bevel is attempted then a fine and easily damaged edge is produced on the pipe which creates additional problems. In addition, if an edge is created, any powered hand beveler will lose one of the guiding surfaces and an irregular cut will be produced. In some instances the amount of material to be removed is so much that it becomes necessary to make two cuts. This requires adjustment of the depth of cut. Clearly, a quick and simple adjustment system for a beveling tool is necessary if end-users are to complete the pipe beveling job properly.

One device has been produced which is a beveling tool that attaches to the arbor bolt of a power saw. This device is sold by PB Tools, address 4431 Sunnyside Boulevard, Maryville Wash. 98 270. This device has an annular, barrel-shaped body within which a core having a beveling cutter head is located. The shank of the core is externally threaded and fits through a central, axial opening in the body. Positioning end nuts are threadably engaged on the core shank and are loosened to allow advancement and withdrawal of the core within the body to vary the extent to which the beveling cutter head protrudes from the outboard end of the tool body. When, in the operator's judgment, the extent of exposure of the beveling cutter head is proper, the positioning nuts are tightened to clamp the core to the body and longitudinally immobilize it relative to the body.

One significant disadvantage of this tool is that the adjustments are not easily reproducible. That is, there is no reliable way for the operator to return the beveling cutter head to a previously selected position of extension from the outboard end of the tubular body. Consequently, beveling depths are not readily reproducible using this tool since there is no easy, reliable way of changing the depth of the bevel cut and then returning to a prior bevel cut setting.

Furthermore, loosening and tightening of the positioning nuts is rather difficult. Access to one of the positioning nuts is through a slot in the body which is not easily accessible. Moreover, wrenches of two different sizes must be employed in separate operations to untighten both positioning nuts and then retighten them.

A further disadvantage of this tool is that head is mounted to the arbor of a power saw by a threaded inboard shank that has the same pitch and diameter of a conventional arbor saw bolt. Because of the relatively large balk of the tool, as contrasted to an arbor bolt head, there is a considerable longitudinal bending moment applied to the inboard shank of the tool during the beveling operation. Consequently, the mounting shank of the tool is quite likely to break, and frequently does so.

A further disadvantage of this tool is that it cannot be attached to and detached from a power saw without uncoupling the attachment of the saw to the saw blade arbor. Consequently, the tool cannot be quickly and easily removed from or attached to a conventional power saw. Moreover, the coupling arrangement employed limits use of the tool to attachment to only a particular type of power saw having a particular type of saw blade mounting.

SUMMARY OF THE INVENTION

The present invention utilizes a beveling cutting bit based upon the type of router bit commonly used in the woodworking industry, but with extensive modifications and a unique holding chuck. The beveling tool of the invention can be easily attached to and detached from a wide variety of power tools safely and conveniently. Moreover, the bevel depth can be quickly and easily changed from among several standard, reproducible bevel depth cuts with a simple operator adjustment performed using only a screwdriver.

One primary object of the invention is to provide a pipe beveling tool that can be used to bevel the cut ends of pipes on a job site that can be used quickly and easily by attachment to a variety of different power tools. Moreover, the beveling tool of the invention can be attached to and detached from power tools, such as a power saw, without disturbing the attachment of the sawblade to the saw.

Another primary object of the invention is to provide a pipe beveling tool that can be quickly and easily adjusted to several different commonly specified pipe bevels. The adjustment of the tool to each bevel depth is highly reliable and easily reproducible. Adjustment maybe performed quickly and easily using only a screwdriver.

A further object of the invention is to provide a pipe beveling tool that is highly stable and which are resists bending moment forces applied perpendicular to the axis of rotation. This results in a uniform, even bevel around the circumference of the pipe end. Furthermore, due to its construction the tool of the invention is unlikely to break off at its coupling connection to the power tool to which is attached.

In one broad aspect the present invention may be considered to be an improvement in a tool for beveling of the end of a pipe. The tool includes a hollow, tubular body member having a central, longitudinal axis of rotation, an inboard end an opposite outboard end, and a core member disposed coaxially within the tubular body and including a beveling cutter head. The improvement of the invention resides in the construction wherein a first of the body and core members is formed with a plurality of longitudinally spaced, transversely oriented latch pin openings and a second of the body and core members is formed with at least one transverse latch pin opening there and. A transversely oriented latch pin is releaseably engaged in the at least one latch pin opening in the second of the body and core members and concurrently and alternatingly engaged in a single of selected one of the latch pin openings in the first of the body and core members. In this way engagement of the latch pin with both of the first and second members longitudinally immobilizes the core member relative to the body member at one of a specific, limited number of reproducible longitudinal distances of extension of the beveling cutter head beyond the outboard end of the body member.

Preferably, the first of the body and core members is the body member and the second of the body and the core members is the core member. That is, the plurality of longitudinally spaced, transversely oriented latching pin openings are preferably formed in the cylindrical, annular wall of the body member. The second member, which is the core member, includes a longitudinal stem located within the body member and coaxially aligned therewith. The core member is preferably formed with a single latching pin opening, which is formed as an annular, radial groove in the stem. The plurality of latching pin openings in the body member are formed as transverse, parallel bores through the wall structure of the body member. The radial groove of the core stem may be selectively and alternatively tangentially aligned with each of the bores in the body member. In this way the core member may be moved telescopically within the body member so that the radial groove of its core resides in longitudinal registration with a single, selected one of the latching pin openings in the body member.

Preferably, adjacent ones of the plurality of transversely oriented latching pin openings in the body member are radially offset from the longitudinal axis of rotation and are arranged alternatingly on diametrically opposite sides of the axis of rotation. This provides greater structural integrity to the annular wall of the body member between the latching pin openings.

The body member has a wall portion and each of the transversely oriented, parallel latching pin openings is preferably a bore internally threaded at the same pitch and diameter through the wall portion of the body member. The latching pin is preferably an adjusting screw that has an outer, enlarged head and an externally threaded shank portion adjacent the head that is threaded at the same pitch and diameter as each of the latching pin opening bores in the tool body. The latching pin is thereby alternatively and selectively engageable in each of the plurality of longitudinally spaced, transversely oriented, internally tapped latching pin opening bores.

The beveling cutter head has a conical shape so that the extent of protrusion of the beveling cutter head from the outboard end of the beveling tool body determines the depth to which a bevel is cut in a transverse pipe end. To adjust the extent to which the beveling cutter head protrudes from the tool body the latching pin is withdrawn and the core is adjusted longitudinally within the tool body until the selected latching pin bore in the tool body is roughly aligned with the radial groove in the stem of the core. The latching pin is then inserted into the selected, aligned latching pin bore and threadably advanced therein using a conventional screwdriver.

The distal end of the shank of the latching pin beyond its threaded portion extends into tangential alignment with the radial groove in the stem of the core, and preferably into a cylindrical opening in the opposite side of the tool body wall. The engagement of the distal end of the latching pin shank with the radial groove in the core stem longitudinally immobilizes the core within the tubular body and sets the extent of protrusion of the beveling cutter head, and hence the bevel cut depth.

The power tool upon which the beveling tool of the invention is mounted is held so that axis of rotation of the beveling tool is then aligned parallel to the axis of alignment of the cut section of pipe. A small diameter follower roller is mounted for free coaxial rotation at the outboard extremity of the beveling cutter head. The roller follower is placed in contact with the outside surface of the cut section of pipe immediately adjacent the cut end. The beveling tool is then rotated by the drive output of the power tool upon which it is mounted and pushed longitudinally toward the pipe section until the outboard end of the tubular body of the beveling tool resides in the abutting relationship with the cut end of the pipe.

The beveling tool of the invention is then advanced in a circular, orbital arc about the cut end of the pipe throughout its entire circumference. During this progression the follower roller rolls and rides along the outer surface of the pipe while the outboard end of the tubular body of the cutter member resides in contact with the cut end of the pipe. By retaining these two points of contact between the beveling tool and the pipe, the axis of rotation of the beveling tool remains parallel to the axis of alignment of the cut section of pipe. As a result, the bevel produced on the cut end of the pipe is uniform throughout the entire circumference of the pipe.

The beveling tool of the invention is highly versatile and may be attached to different power implements. Preferably, the inboard end of the tubular body member is formed with both an externally threaded nipple and an internally threaded socket located coaxially within the externally threaded nipple. To attach the beveling tool of the invention to a power saw a mounting support is provided for positioning against a rotary sawblade of the power saw. The mounting support is formed with an enlarged stabilizing pad for bearing against the outside surface of its sawblade and a central hub having an internally threaded socket for receiving the nipple in threaded engagement therewith. A central axial aperture is defined in the hub to receive the shank of a sawblade anchoring arbor bolt.

The power saw may thereafter be utilized with or without the beveling tool of the invention without disturbing the attachment of the sawblade. When a pipe is to be beveled the beveling tool is merely aligned with the center of the mounting support and the nipple is screwed into the socket in the central hub of the mounting support. The beveling tool of the invention can thereupon be utilized as previously described. When beveling of a pipe is complete the nipple is merely unscrewed from the socket and the beveling tool is removed from the mounting support, which remains on the power saw. The beveling tool of the invention thus does not interfere with the conventional use of the power saw for its intended purpose.

Although a mounting support with an enlarged stabilizing pad is preferred, the beveling tool of the invention may also be attached to a power tool by a mounting nut adapted for positioning against a rotary drive element of a wide variety of power tools. The mounting nut is formed with external flats for engagement by a wrench. A central axial aperture is defined in the hub to receive the shank of an anchoring arbor bolt engageable with the rotary drive element of the power tool. The mounting nut also includes within its structure and internally threaded socket for receiving the nipple of the body member of the beveling tool in threaded engagement therewith.

The invention may be described with greater clarity and particularity by reference to the accompanying drawings.

DESCRIPTION OF THE EMBODIMENT

Figure 1:
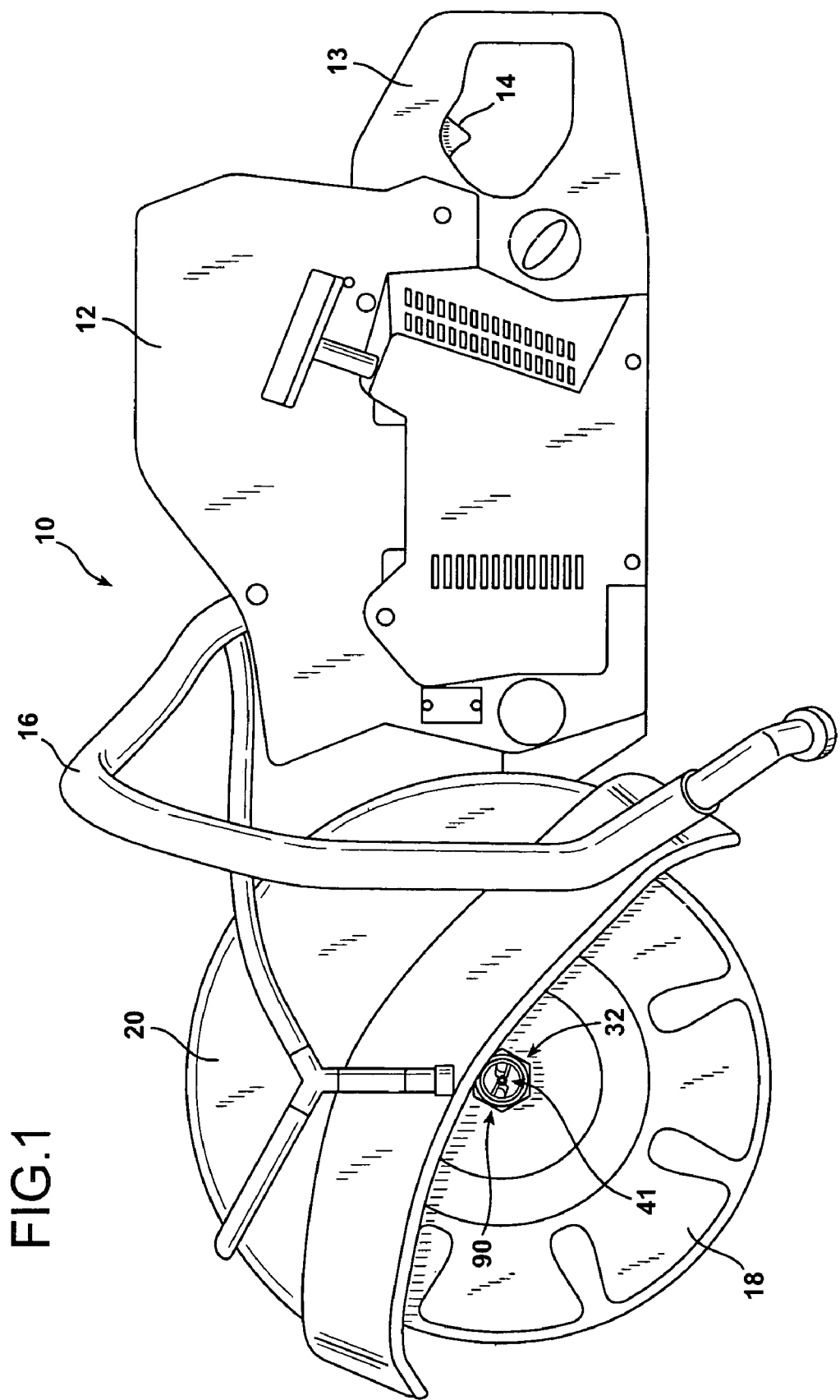
FIG. 1 is a side elevational view illustrating the pipe beveling tool of the invention attached at the arbor bolt position of a saw of the type often used for cutting pipe at job sites, with the sawblade thereof still in position.

FIG. 1 illustrates a pipe cutting saw indicated generally at 10 having a small gasoline powered engine in the body area 12, a rear handgrip 13 housing a trigger 14, a front stabilizing handgrip 16, and a pipe cutting blade 18 partially surrounded by a protective blade guard 20. In addition, a pipe beveling tool 32 according to the invention is attached to the pipe cutter 10 for coaxial rotation with the sawblade 18 by means of an elongated arbor bolt 33, which is visible in FIG. 4.

Figure 2:
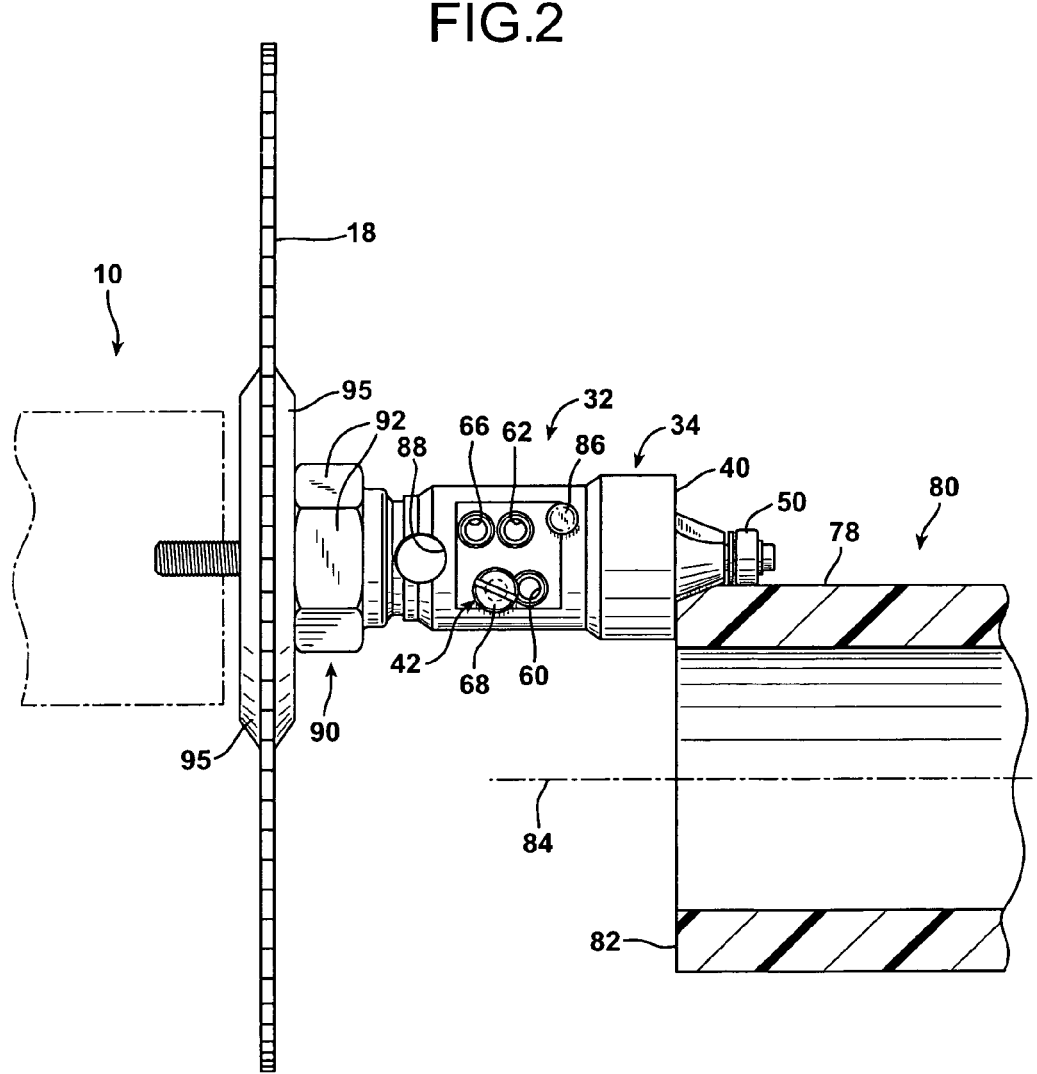
FIG. 2 is a front elevational detail illustrating use of the beveling tool of the invention attached as shown in FIG. 1 set in a selected position of adjustment and beveling a pipe end to a relatively shallow depth of bevel.
Figure 4:
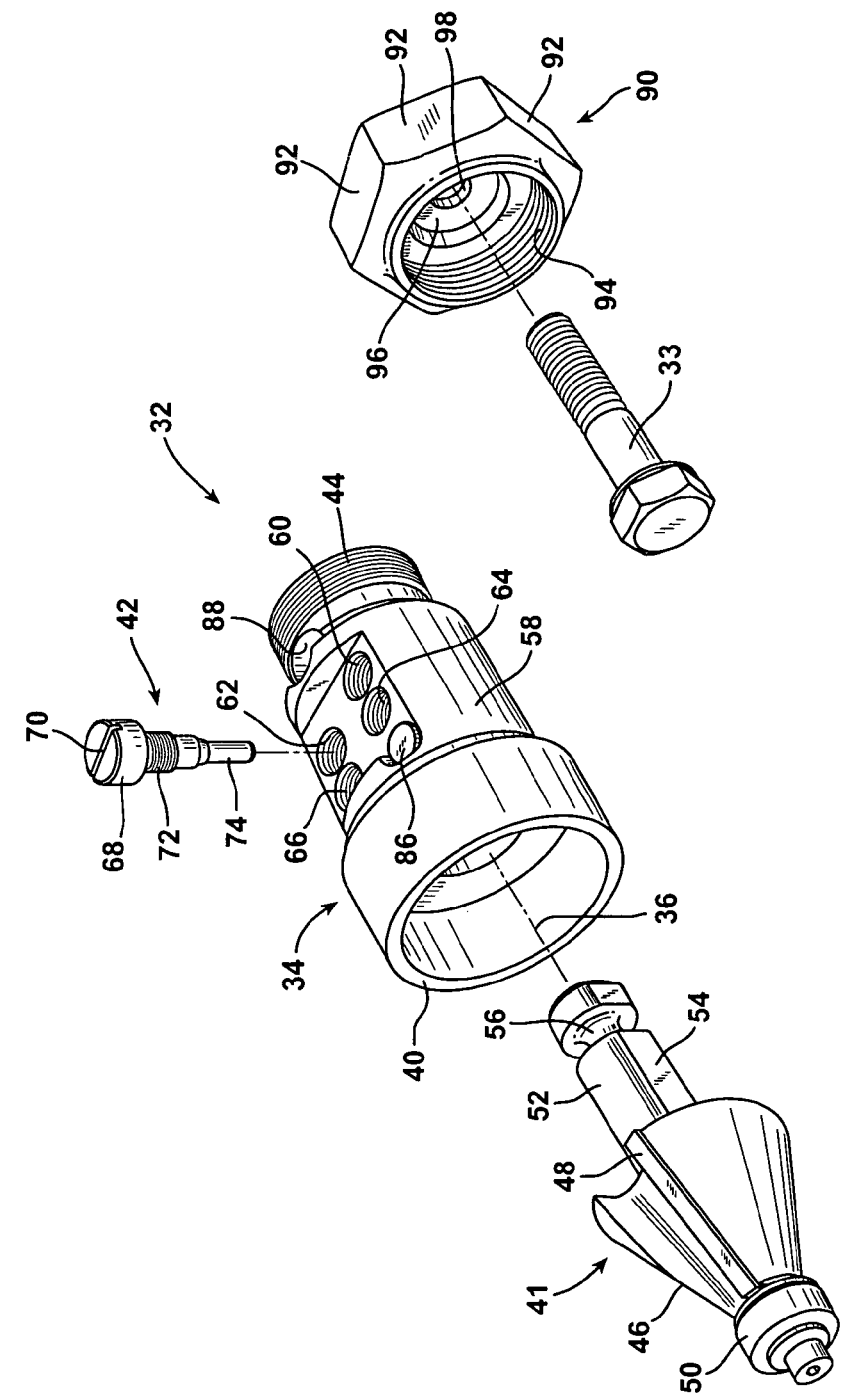
FIG. 4 is an exploded perspective view illustrating the beveling tool and its mounting support elements as employed in FIGS. 1–3.

The pipe beveling tool 32 and its connection to the pipe cutting saw 10 is illustrated in greater detail in FIGS. 2 and 4. As illustrated in the drawing figures, the beveling tool 32 is comprised of a hollow, barrel-shaped tubular body 34 having a central, longitudinal axis of rotation 36, an inboard end 38, and an opposite, outboard cylindrical annular end 40. The pipe beveling tool 32 is also comprised of a core member 41 and a latching pin in the form of an adjusting screw 42.

The core member 41 is disposed coaxially within the tubular body member 34 and includes a beveling cutter head 46 having a plurality of blades 48 arranged in a generally frustoconical arrangement and converging toward a guide follower roller 50 rotatably mounted at the outboard extremity of the core 41 for coaxial rotation about the longitudinal axis 36. The core 41 is also formed with a longitudinal stem 52 which is formed as a generally cylindrical structure, but with a flat, longitudinally extending locking pin engaging face 54. The stem 52 is also formed with a radially inwardly directed, circumferential, annular groove 56 near its inboard end.

The tubular body 34 is formed with an annular wall 58 through which four longitudinally spaced and longitudinally offset, internally tapped, latching pin bores 60, 62, 64, and 66 are defined. The latching pin bores 60, 62, 64, and 66 are all internally threaded at the same pitch and diameter.

If desired, the flat face of the wall 58 of the tubular body 34 may be labeled with indicia adjacent each of the latching pin bores 60, 62, 64, and 66. Such indicia will typically indicate the depth of bevel to be cut. For example, the latching pin bore 66 may be labeled with a depth of cut of one-eighth of an inch. The latching pin bore opening 62 may be labeled with a depth of cut of one-quarter of an inch, while the latching pin opening 64 may be labeled with a depth of cut of three-sixteenths of an inch. The latching pin bore opening 60 may be labeled with a depth of cut of five-sixteenths of an inch. It is important for the setting of the depth of bevel cut to be less than the pipe wall thickness.

Figure 3:
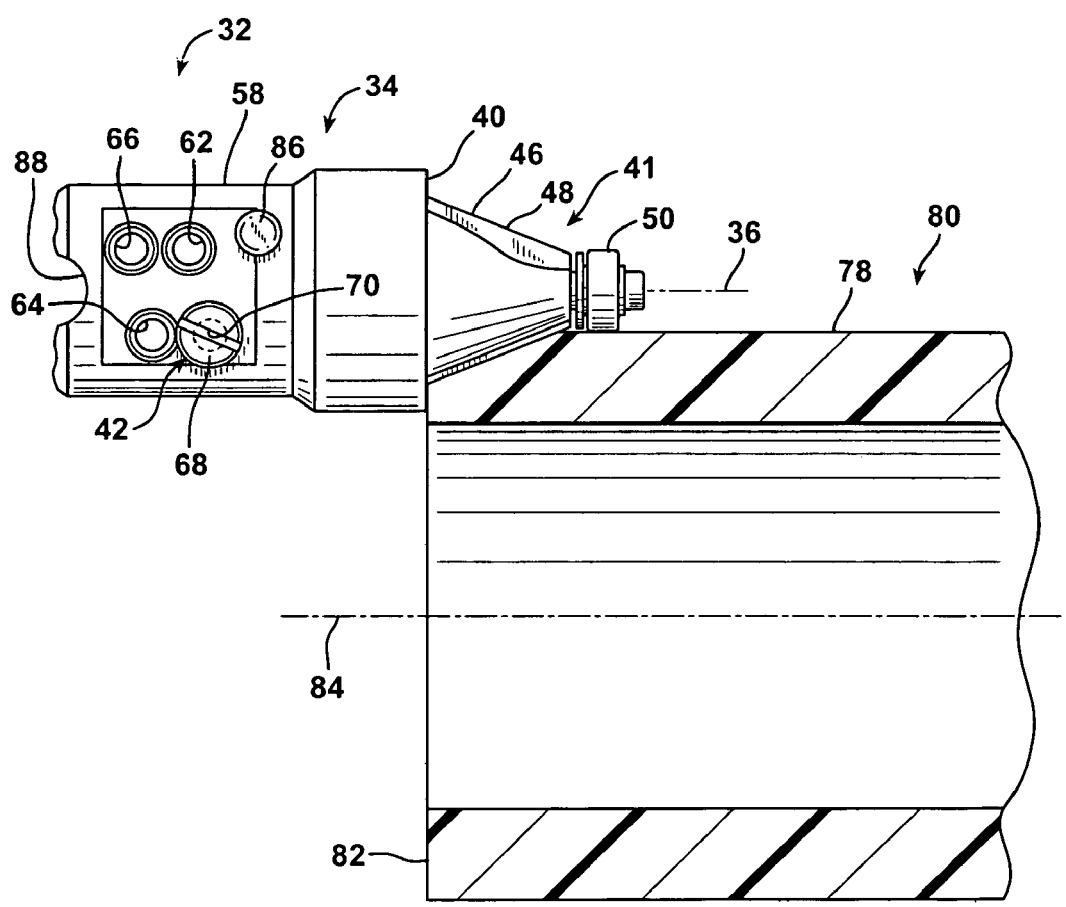
FIG. 3 is a front elevational detail illustrating use of the beveling tool of the invention attached as shown in FIG. 1 set in a different selected position of adjustment and beveling a pipe end to a relatively deep depth of bevel.

It should be noted that all of the latching pin bore openings 60, 62, 64, and 66 are radially offset from the longitudinal axis 36 of the beveling tool 32. Furthermore, each of the adjacent latching pin openings are on opposite sides of the axis of rotation 36. That is, the latching pin bore openings 60, 62, 64, and 66 are offset from the longitudinal axis of rotation 36 and are arranged alternatingly on diametrically opposite sides of the longitudinal axis 36, as illustrated in FIGS. 2 and 3. This maximizes the amount of structural material in the annular wall 58 of the tubular body 34 that exists between the bore openings 60, 62, 64, and 66. The structural integrity of the tubular body 34 is thereby enhanced.

The adjusting screw 42 is releaseably engageable with the latching pin opening groove 56 in the core stem 52 and any selected one of the longitudinally aligned latching pin bores 60, 62, 64, or 66. The adjusting screw 42 has a head 68 with a blade screwdriver slot 70 defined therein and a shank having a proximal externally threaded portion 72 with threads that match the pitch and diameter of the latching pin opening bores 60, 62, 64, and 66. The distal portion 74 of the shank of the adjusting screw 42 has a smooth wall surface and is slightly narrower in diameter than the proximal, externally threaded portion 72. The diameter of the distal portion 74 of the shank of the adjusting screw 42 fits smoothly into the radial groove 56 or in the core stem 52 when the adjusting screw 42 is inserted and threadably advanced into any one of the latching pin bores 60, 62, 64, or 66. Smooth bores (not visible) are defined in the annular wall 58 of the tubular body 34 diametrically opposite the internally tapped bore pin openings 60, 62, 64, and 66. These smooth bores are of a size to receive and stabilize the tip of the distal portion 74 of the adjusting screw 42.

The core 41 is disposed within the tubular body member 34 and is longitudinally adjustable therewithin to vary the extent to which the beveling cutter head 46 protrudes beyond the outboard end 40 of the body member 34. As illustrated in FIG. 4, the adjusting screw 42 may be unscrewed from any one of the latching pin opening bores 60, 62, 64, and 66 in the annular wall 58 of the tubular body 34. Removal of the adjusting screw 42 allows the core 41 to be longitudinally adjusted within the tubular body 34 so as to project from the outboard end 40 of the tubular body member 34 a selected distance to achieve a desired depth of cut of a bevel on the end of a pipe 80. The latching pin 42 is than inserted and screwed into the single one of the latching pin bores 60, 62, 64, or 66 that has been aligned with the groove 56 in the stem 52 of the beveling tool core 41.

For example if a bevel cut to a radial depth of one-quarter of an inch is desired from the outer wall surface 78 of the pipe 80, the latching pin 42 is engaged and advanced into the latching pin bore 62 in the tubular body 34, as illustrated in FIG. 2. At this setting the beveling tool 32 of the invention will cut away material from the cut end 82 of the pipe 80 to a depth of one-quarter of an inch from the surface 78, if the operator properly guides the beveling tool in 32 around the perimeter of the cut end 82 of the pipe 80. To do this the operator grasps the hand grips 13 and 16 of the pipe cutting saw 10 while depressing the trigger 14. Since the pipe beveling tool 32 is coupled to the elongated arbor bolt 33 of the pipe cutting saw 10, both the sawblade 18 and the beveling tool 32 of the invention rotate upon depression of the trigger 14. The operator advances the pipe cutting saw 10 in a circular arc while holding it so that the guide roller 50 is maintained in contact with the outer surface 78. At the same time the outboard end 40 of the tubular body 34 of the beveling tool 32 is maintained in contact with the pipe end 82. As the beveling tool 32 is rapidly driven in rotation about its own axis, the pipe cutting saw 10 is moved to carry the beveling tool 32 in orbiting rotation about the axis of the pipe 80 while maintaining the beveling tool axis 36 parallel to the pipe axis 84. With the pipe cutting saw 10 operated in this manner, the beveling tool 32 accurately creates a uniform bevel one-quarter inch deep in the outer surface 78 of the pipe section 80 at the severed end 82 thereof.

The depth of the bevel may be easily changed to a predetermined, alternative precise depth by removing the latching pin 42, longitudinally relocating the bevel cutting tool core 41 relative to the housing 34 and reengaging the adjusting screw 42 in a different one of the latching pin opening bores 60, 62, 64, and 66. Furthermore, this can be done without the necessity for any measurement or experimentation.

For example, if the operator desires to cut a bevel to a radial depth of five-sixteenths of an inch from the surface 78 of the pipe section 80, the adjusting screw 42 is loosened and removed from the latching pin opening bore 64 for a three-sixteenths inch depth of bevel, illustrated in FIG. 2. The core 41 is moved longitudinally a short distance in an outboard direction away from the sawblade 18 while the adjusting screw 42 is pushed partially into the latching pin opening bore 60, which is located in an outboard direction from the latching pin opening bore 64 while holding the tip of the distal end 74 of the latching pin shank 42 against the outer surface of the core shank 52 with a light pressure. As soon as the core 41 is moved into longitudinal alignment with the radial groove 56 in the core shank 52, there is no resistance to the light radially inwardly directed pressure on the adjusting screw 42, and the tip of the shank 74 protrudes into tangential alignment with the radial groove 56.

The operator then screws the latching pin head 68 in a clockwise direction utilizing a screwdriver to advance the threaded proximal portion 72 of the latching pin shank into threaded engagement with the internal threads of the latching pin bore opening 60. The entire distal end 74 of the adjusting screw 42 is than advanced tangentially across the length of the portion of the groove 56 aligned therewith. The core 41 is once again held longitudinally immobilized relative to the tubular beveling tool body 34, but with the beveling cutter head at an extended distance of projection beyond the outboard end 40 of the beveling tool body 34, as illustrated in FIG. 3. As can be seen by a comparison of the position of the beveling cutter head 46 relative to the tubular body 34 of the beveling tool 32 in FIGS. 2 and 3, different depths of beveling cuts can be achieved merely by selecting the appropriate latching pin opening bore 60, 62, 64, or 66 for the depth of bevel desired.

Moreover, the changes in depth of bevel cut are precisely reproducible merely by selecting the appropriate latching pin opening 60, 62, 64, or 66 and engaging the adjusting screw 42 therein. An operator can quickly and accurately change the depth of bevel cuts by loosening the adjusting screw 42, repositioning it for the depth of cut desired, shifting the core 41 relative to the tubular body 34 to align the latching pin shank with the groove 56, and retightening the adjusting screw 42.

There are two other openings in the tubular body portion 34 of the beveling tool 32. Specifically, one of these openings is created through the wall 58 off center from the core axis 36 and a hardened locking pin 86 is inserted through it. The shank of the hardened pin 86 extends through the segment-shaped cavity created within the hollow tubular body portion 34 adjacent to the flat surface 54 of the core 41. The hardened pin 86 is force fit through openings on opposing sides of the tubular body walls 58. During operation of the beveling tool 32 the hardened pin 86 is always in position as illustrated in FIGS. 2 and 3 so that the core 41 is immobilized from rotation relative to the tubular body 34 so that it turns in rotation therewith.

Another, larger smoother radial bore 88 is defined through the wall structure at the inboard end 44 of the tubular body 34. The bore 88 serves as an opening to admit a lever rod that is used as a wrench to tighten or loosened the beveling tool 32 relative to the mounting structure and power tool to which it is attached.

There are several different mounting arrangements by which the beveling tool 32 may be attached to a power tool. For example, an adapter mounting nut 90 may be utilized as illustrated in drawing FIGS. 1–4. The mounting nut 90 is formed with a hexagonal outer configuration having external flats 92 for engagement by a wrench. The adapter mounting nut 90 is also formed within an internally threaded socket 94 for receiving the nipple 44 of the beveling tool body member 34 in threaded engagement therewith. The mounting nut 90 has a transverse, flat inboard annular wall 96 with a central axial aperture 98 defined therein. The aperture 98 receives the shank of the sawblade anchoring arbor bolt 33 which is tightened to secure both the mounting nut 90 and the sawblade 18 to the arbor of the pipe cutting saw 10. Typically a relatively large blade compression flange 95 is located between the mounting nut 90 and the sawblade 18, as illustrated in FIG. 2.

The inboard end 44 of the tubular body 34 is formed with an externally threaded nipple. The pitch and diameter of the external threads of the nipple at the inboard end 44 and the internal threads of the socket 94 are matched so that the nipple can be easily screwed into the socket 94. The direction of the threads of the nipple and the mounting nut socket 94 are such that rotation of the sawblade 18 and the beveling tool 32 serves only to tighten the beveling tool 32 onto the mounting nut 90 when the beveling tool 32 is rotated. Consequently, it is sometimes necessary to insert a lever rod into the radial aperture 88 in order to unscrew the beveling tool 32 from the mounting nut 90 following use.

Figure 4A:
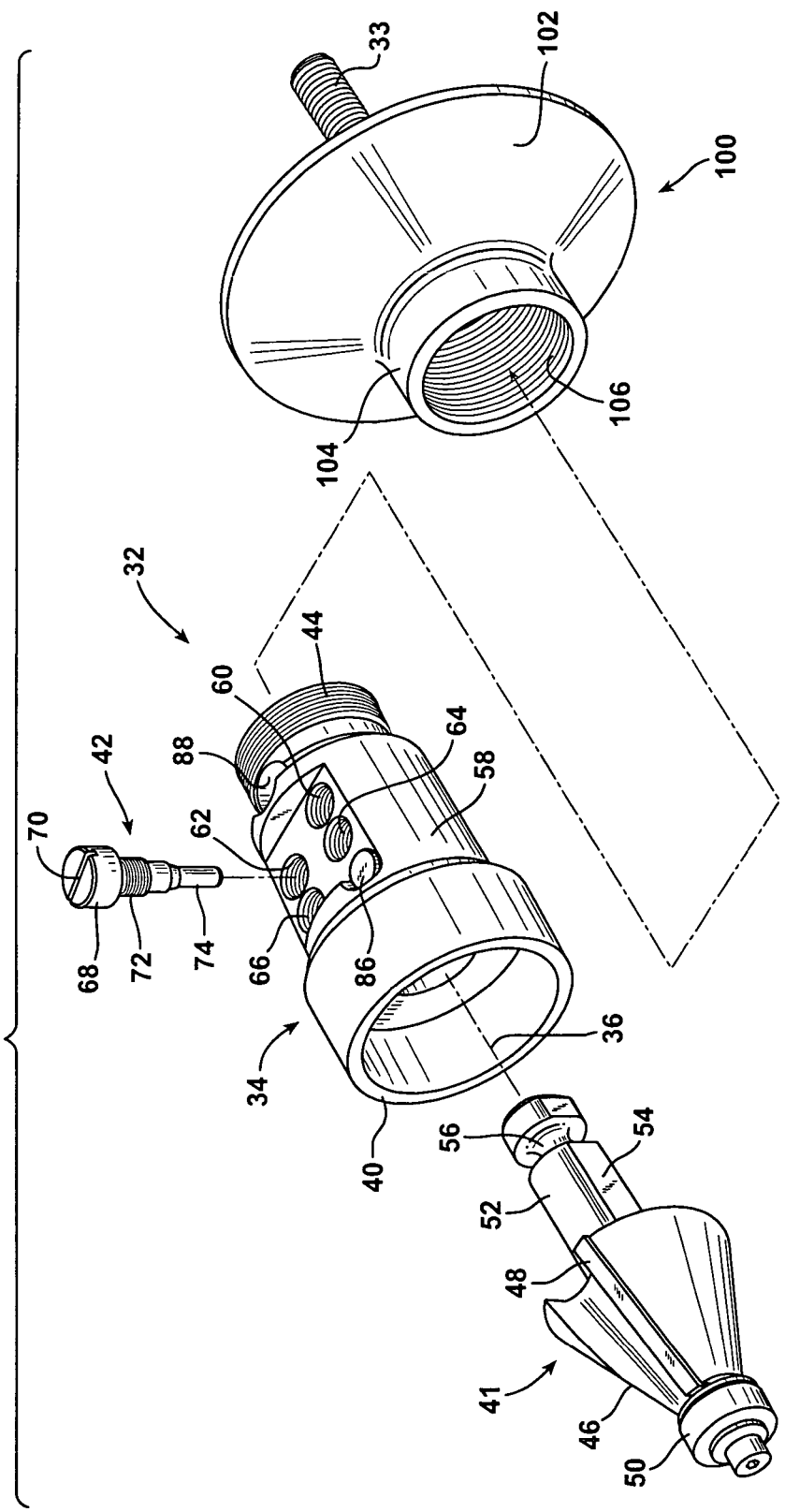
FIG. 4A is an exploded perspective view illustrating the beveling tool of the invention employed with alternative mounting support components.
Figure 5:
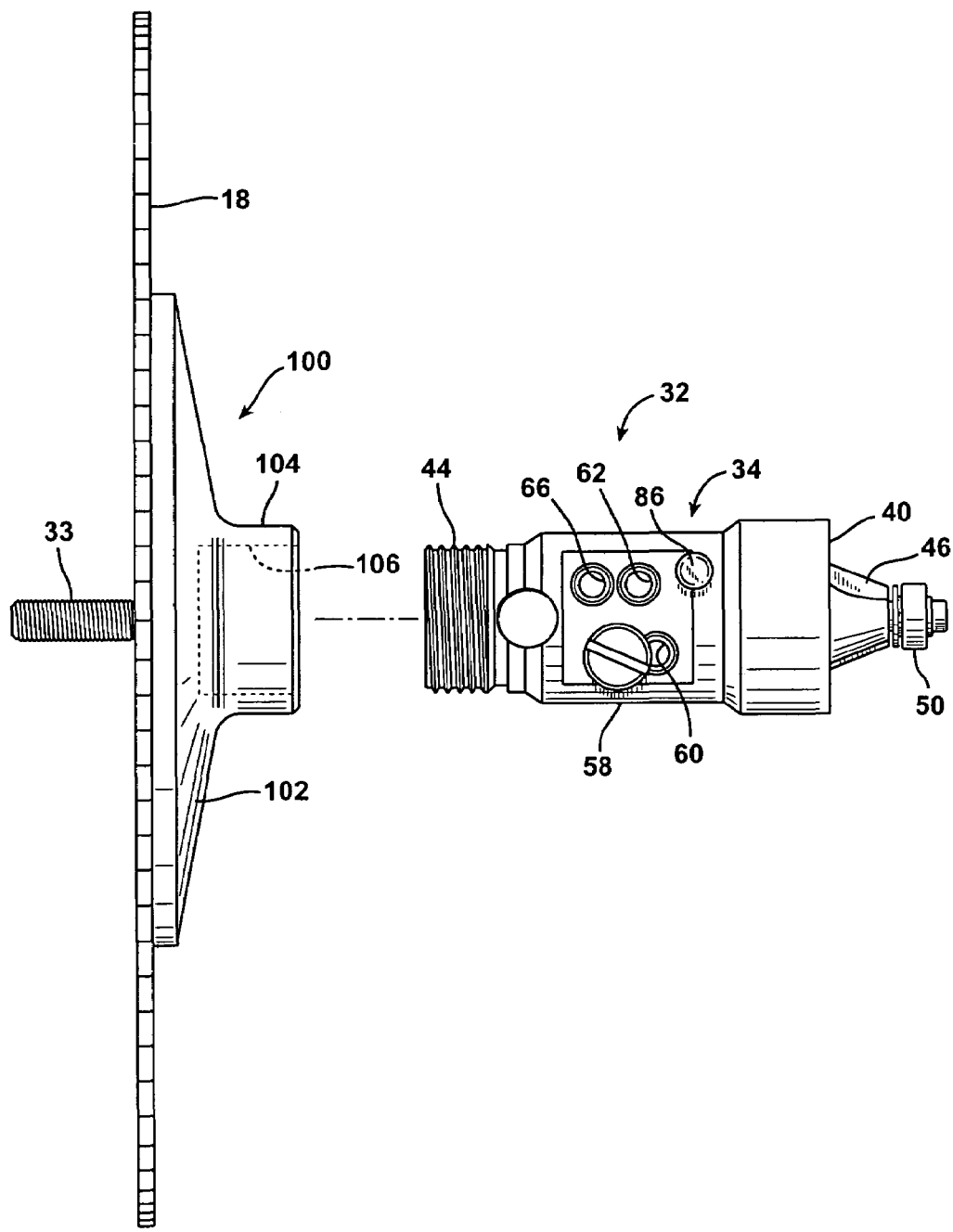
FIG. 5 is a partially exploded front elevational detail illustrating the manner of attachment of the beveling tool of the invention to the mounting components illustrated in FIG. 4A.

While the hexagonal mounting nut 90 illustrated in FIG. 4 is often quite adequate, a preferred mounting arrangement is illustrated in FIG. 4A. As shown in that drawing figure, the mounting nut 90 is replaced by a mounting support 100 which is formed with a large, annular, generally frustoconical stabilizing pad 102 that in use bears against the outside surface of the sawblade 18. The mounting support 100 is also formed with a central hub 104 having an internally threaded socket 106 for receiving the nipple at the inboard end 44 of the pipe beveling tool 32 therewith. As with the mounting nut 90, a central, axial aperture (not visible), essentially the same as the aperture 98, is defined in the flat, transverse, recessed wall of the hub 104 to receive the shank of the sawblade arbor bolt 33, as indicated in drawing FIGS. 4A and 5.

Figure 6:
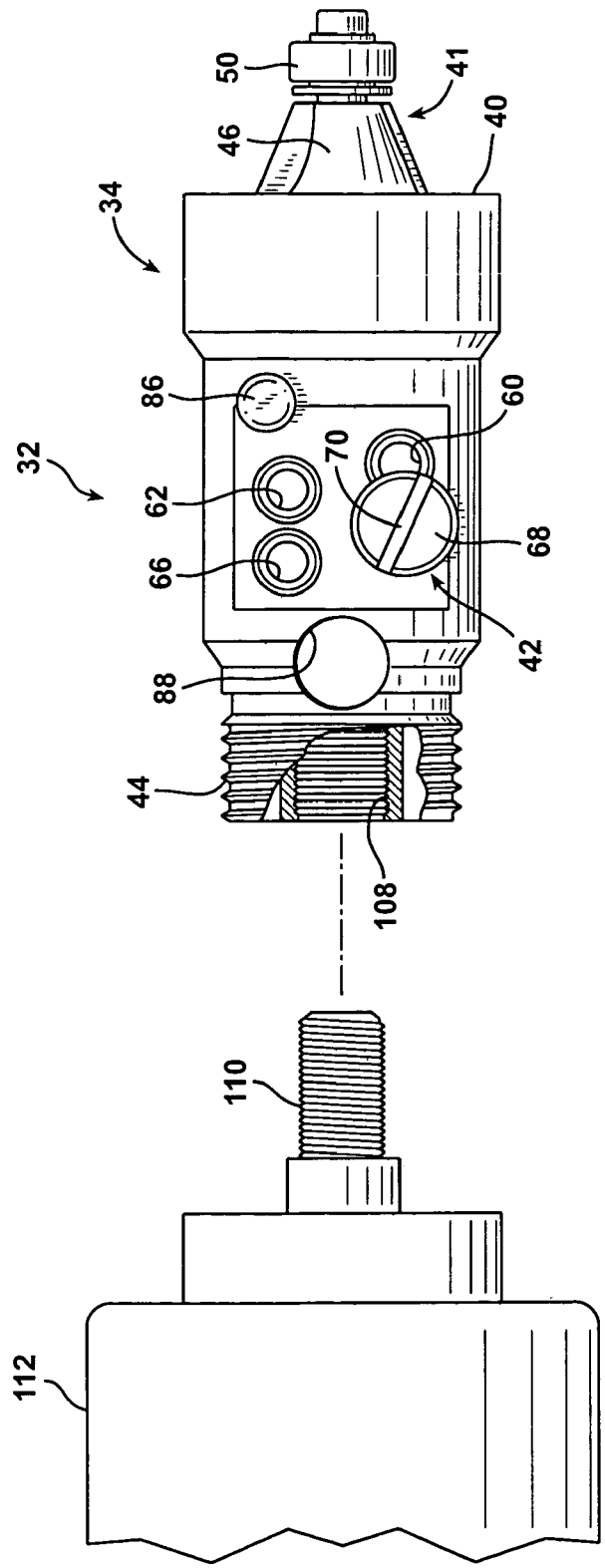
FIG. 6 is a partially exploded front elevational detail view illustrating the attachment of the beveling tool of the invention to a power grinding tool that has a protruding arbor stud rather than a detachable arbor bolt.
Figure 7:
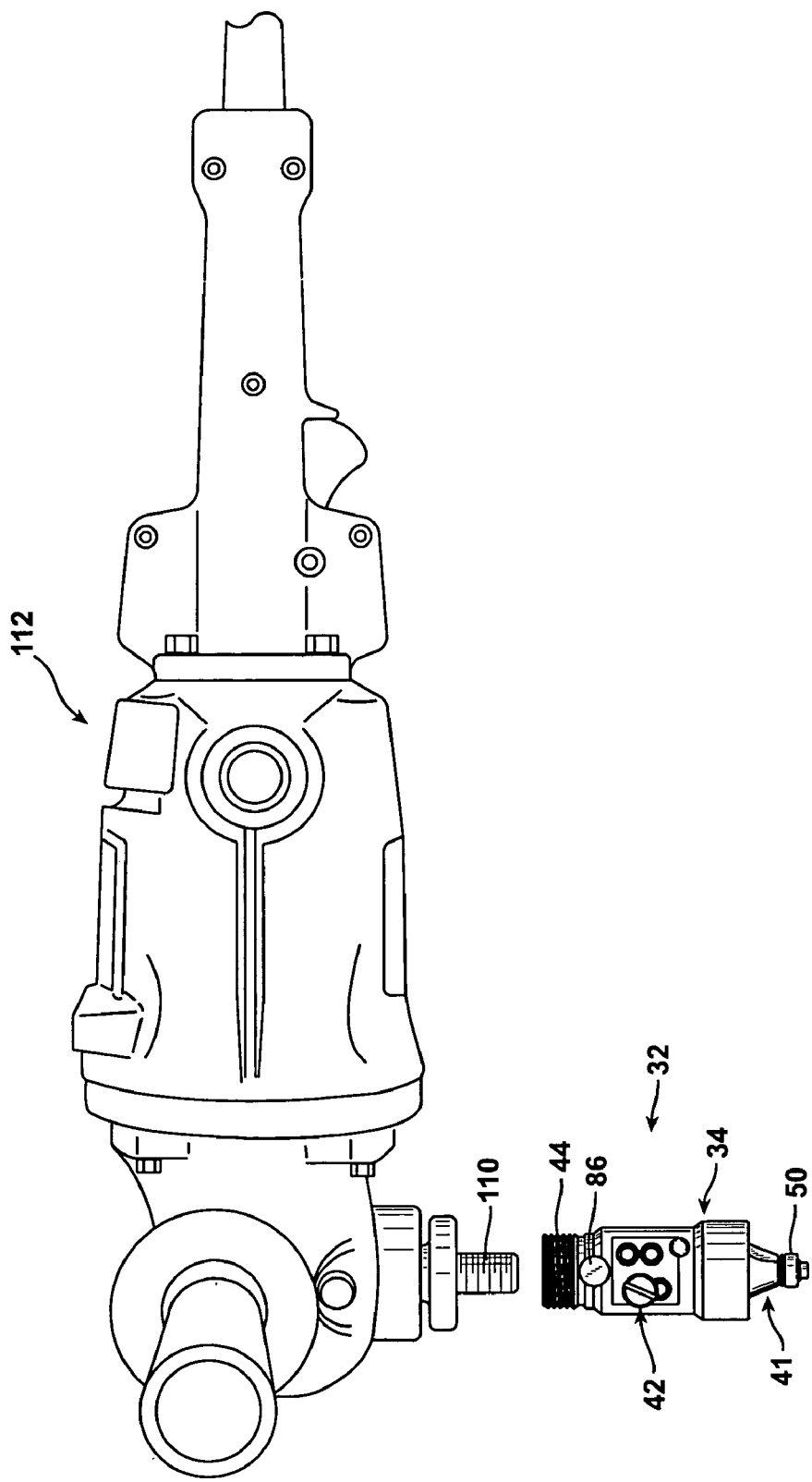
FIG. 7 is a partially exploded side elevational view illustrating the complete power grinding tool and the attachment of the beveling tool of the invention.

The inboard end 44 of the beveling tool body 34 is preferably formed with both the externally threaded nipple and an internally threaded socket 108 located axially within the externally threaded nipple, as illustrated in FIG. 6. The provision of both the externally threaded nipple 44 and the internally threaded socket 108 provide the beveling tool 32 with a greatly enhanced versatility of use. That is, it can be attached to many other different types of power tools, other than a pipe cutting saw 10. For example, and as illustrated in FIGS. 6 and 7, the pipe beveling tool 32 can be attached to the outwardly projecting mounting attachment stud 110 of a tool such as an angle grinder 112. The stud 110 of the angle grinder 112 has male threads of five-eighths inch diameter and eleven threads per inch. This is a standard pitch and diameter for power tools having projecting attachment studs. The socket 108 of the tubular body 34 of the beveling tool 32 of the invention has matching female threads in its internally threaded bore. This allows the beveling tool 32 to be attached to and driven by an angle grinder or any other power tool having such an externally projecting attachment stud.

Figure 8:
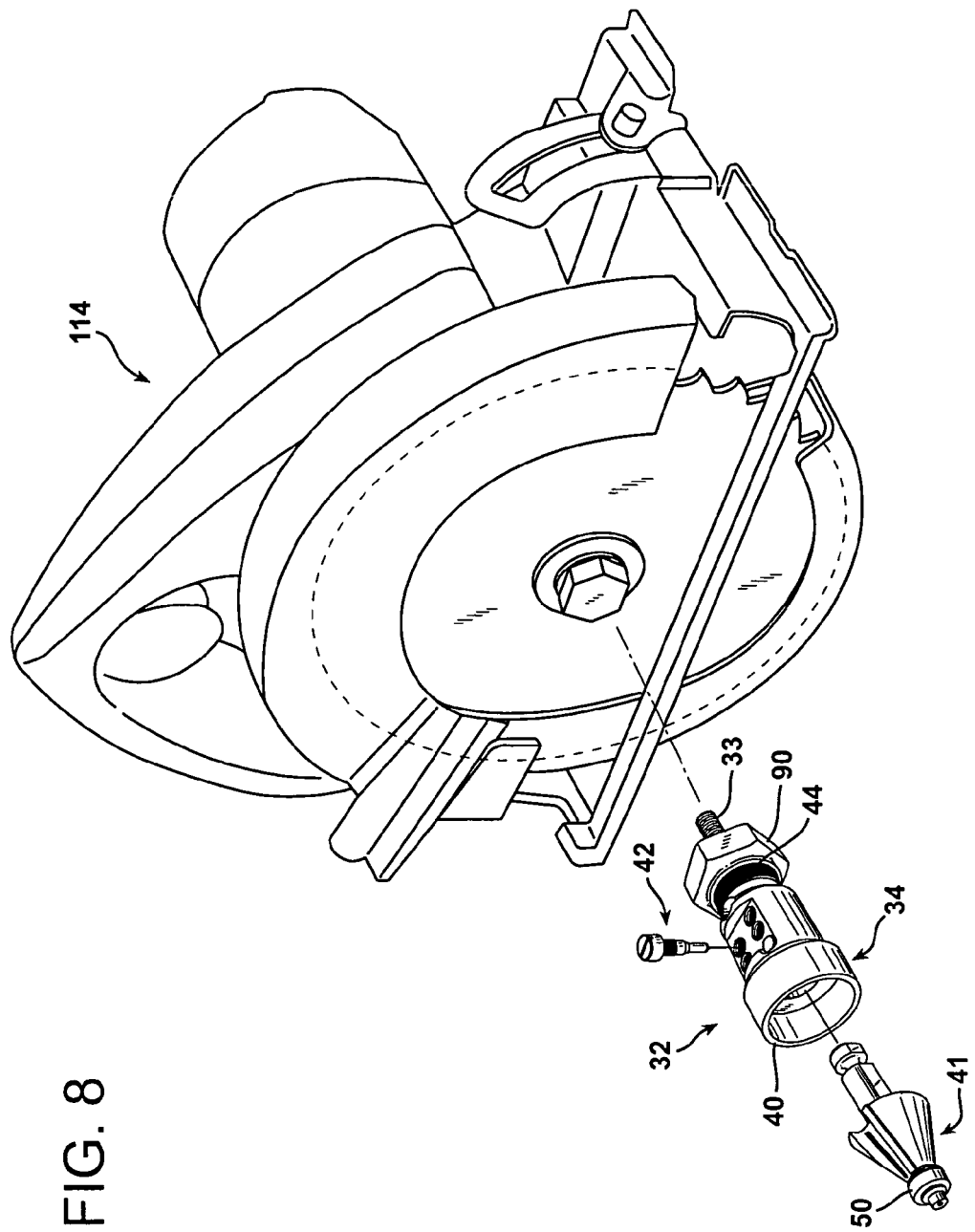
FIG. 8 is a partially exploded perspective view illustrating the attachment of the beveling tool of the invention to a Skil® power saw.

The beveling tool 32 can be utilized with many other different tools as well. For example, it can be attached to a conventional rotary Skil® power saw 114 as illustrated in FIG. 8 utilizing the mounting nut 90. Alternatively, it could be attached to the Skil® saw 114 utilizing the mounting support 100. In addition, the versatile adapter arrangement provided for the beveling tool 32 allows it to be used with many other different power tools that have a rotary output, such as a chop saw, a router, as well as numerous other different tools.

Undoubtedly, numerous variations and modifications of the invention will become readily apparent to those familiar with on-site pipe beveling equipment. Accordingly, the scope of the invention should not be construed as limited to this specific embodiment depicted and described, but rather as defined in the claims appended hereto.

We claim:

1. In a tool for beveling the end of a pipe including a hollow, tubular body member having a central, longitudinal axis of rotation, an inboard end and an opposite, outboard end, and a core member disposed coaxially within said tubular body member and including a beveling cutter head, the improvement wherein said body is formed with a plurality of longitudinally spaced, transversely oriented latching pin openings and said core member is formed with at least one transverse latching pin opening therein, and further comprising a transversely oriented latching pin releaseably engaged in said at least one latching pin opening in said core member and concurrently and alternatively engaged in a single, selected one of said latching pin openings in said body member, whereby engagement of said latching pin with both said first and second members longitudinally immobilizes said core member relative to said body member at one of a specific, limited number of reproducible longitudinal distances of extension of said beveling cutter head beyond said outboard end of said body member.

2. A tool according to claim 1 wherein said core member includes a longitudinal stem located within said body member and coaxially aligned therewith, and said at least one latching pin opening in said core member is formed as an annular, radial groove in said stem, and said plurality of latching pin openings in said body member are formed as parallel openings offset from radial alignment with said core stem, wherein said core member is movable telescopically within said body member so that said radial groove is tangentially aligned with a single, selected one of said latching pin openings in said body member.

3. A tool according to claim 2 wherein adjacent ones of said plurality of transversely oriented latching pin openings in said body member are radially offset from said longitudinal axis of rotation and are arranged alternatingly on diametrically opposite sides thereof.

4. A tool according to claim 2 wherein said core member is constructed with a flat, longitudinally extending surface portion, and said body member has a wall portion with a locking pin opening defined therethrough and further comprising a locking pin residing within said locking pin opening and passing through said body member and against said flat surface portion of said core member, whereby said body and said core member are locked for rotation together.

5. A tool according to claim 1 wherein each of said plurality of longitudinally spaced, transversely oriented latching pin openings is internally threaded at the same pitch and diameter and said latching pin is an adjusting screw that has a head and a shank with an externally threaded proximal portion alternatively threadably engageable in each of said plurality of longitudinally spaced, transversely oriented latching pin openings.

6. A tool according to claim 1 wherein said inboard end of said tubular body member is formed with an externally threaded nipple and with a radial bore therein to receive a rod for tightening said nipple into a mounting structure.

7. A tool according to claim 1 wherein said inboard end of said tubular body member is formed with an internally threaded socket.

8. A tool according to claim 1 wherein said inboard end of said body member is formed with both an externally threaded nipple and with an internally threaded socket located coaxially within said externally threaded nipple.

9. A tool according to claim 1 wherein said inboard end of said tubular body member is formed with an externally threaded nipple and further comprising a mounting support for positioning against a rotary sawblade of a power saw, wherein said mounting support is formed with an enlarged, stabilizing pad for bearing against an outside surface of the sawblade and a central hub having an internally threaded socket for receiving said nipple in threaded engagement therewith, and wherein a central axial aperture is defined in said hub to receive the shank of a sawblade anchoring arbor bolt.

10. A tool according to claim 1 wherein said inboard end of said tubular body member is formed with an externally threaded nipple and further comprising a mounting nut for positioning against a rotary drive element of a power tool wherein said mounting nut is formed with external flats for engagement by a wrench and an internally threaded socket for receiving said nipple of said body member in threaded engagement therewith, and wherein a central axial aperture is defined in said nut to receive the shank of an anchoring arbor bolt engageable with said rotary drive element.

11. An attachment device for beveling the end of a pipe comprising:
 a hollow, tubular body member having a central, longitudinal axis of rotation, a plurality of longitudinally spaced, transversely extending latching pin bores, an inboard end configured for alternative attachment to different power tools and an opposite outboard end,
 a core member disposed coaxially within said tubular body member and including a beveling cutter head and a longitudinal stem disposed within said tubular body member and longitudinally adjustable therewithin to vary the extent to which said beveling cutter head protrudes beyond said outboard end of said body member, said core member having a latching pin opening, and
 a latching pin directed transversely and alternatively through a selected one of said plurality of latching pin bores of said tubular body member and engageable with said latching pin opening of said core member to longitudinally immobilize said core member at a specific one of a limited number of predetermined longitudinal distances of extension of said beveling cutter head beyond said outboard end of said body member.

12. A device according to claim 11 wherein said tubular body member has an annular wall, and said plurality of longitudinally spaced, transversely extending latching pin bores are defined through said annular wall, and said latching pin opening of said core member may be alternatively aligned with each of said transversely extending latching pin bores, whereby said latching pin is releaseably engageable with said latching pin opening in said core member and concurrently with a single longitudinally aligned one of said latching pin bores.

13. A device according to claim 12 wherein said latching pin opening in said core member is formed as a radial, annular groove in said stem, and adjacent ones of said latching pin bores in said wall of said body member are located on diametrically opposite sides of said central, longitudinal axis of rotation and are selectively tangentially aligned with said radial groove when said latching pin is engaged therein.

14. A device according to claim 11 wherein said inboard end of said body member is formed with both an externally threaded nipple and also with an internally threaded socket located coaxially within said externally threaded nipple.

15. A tool for beveling the end of a pipe comprising:
 a hollow, tubular body having a central, longitudinal axis of rotation, an inboard coupling end and an opposite outboard working end, and a plurality of longitudinally spaced, transversely directed latching pin bores of equal size defined therethrough,
 a core member disposed coaxially within said tubular body and including a beveling cutter head and a longitudinal stem having a radially inwardly directed, circumferential latch position groove, and
 a transversely oriented latching pin engaged in a selected one of said latching pin bores in said body and with said latch position groove of said core stem, whereby the alternative selection of each of said latch position bores for insertion of said latching pin determines the longitudinal position of said core stem latch position groove within said body for engagement by said latching pin, and the extent of protrusion of said core member cutter head from said outboard end of said tubular body.

16. A tool according to claim 15 wherein said inboard coupling end of said tubular body is formed with an externally threaded nipple, and further comprising a mounting support for positioning against a rotary sawblade of a power saw wherein said mounting support is formed with an enlarged stabilizing pad for bearing against an outside surface of the sawblade and a central hub having an internally threaded socket for receiving said nipple in threaded engagement therewith.

17. A tool according to claim 16 wherein a central axial aperture is defined in said a hub to receive the shank of a sawblade anchoring arbor bolt.

18. A tool according to claim 15 wherein said latch pin bores in said tubular body are internally threaded at a uniform pitch and diameter and said latching pin has a shank with a threaded portion having the same pitch and diameter.

19. A tool according to claim 15 wherein said beveling cutter head is configured and said latching pin bores in said tubular body are spaced to produce bevels of depth of cut that differ from each other by about one-sixteenth of an inch.

* * * * *